METHOD OF MANUFACTURING MICROSTRUCTURES

Filed March 31, 1970

United States Patent Office 3,690,966

Patented Sept. 12, 1972

3,690,966

METHOD OF MANUFACTURING MICROSTRUCTURES

Yutaka Hayashi and Yasuo Tarui, Tokyo, Japan, assignors to Kogyo Gijutsuin, Tokyo-to, Japan Filed Mar. 31, 1970, Ser. No. 24,168
Claims priority, application Japan, Oct. 15, 1969, 44/81,843
Int. Cl. H01l 7/44
U.S. Cl. 148—187 8 Claims

ABSTRACT OF THE DISCLOSURE

A method of manufacturing a microstructure which comprises forming a substance layer on the surface of a workpiece, working said substance layer into a desired configuration during or after said formation thereof, changing the composition of a portion of the said surface layer 7, said surface layer having a hole in the portion of said surface layer whose composition has been changed, removing the remainder of said substance layer previously formed through said hole, and utilizing as a processing means the portion of said surface layer of changed composition, adjacent to said workpiece.

BACKGROUND OF THE INVENTION

The present invention relates to a method of manufacturing a microstructure and more particularly, relates to a method of manufacturing microstructures of semiconductor elements, integrated circuits and thin films.

It has been difficult to perform positioning and photoengraving of patterns having dimensions less than 1$\mu$ by the photoengraving technique which has been used in the conventional manufacture of microstructure of semiconductor elements, integrated circuits and thin films.

At present, the minimum value of photoengraving accuracy is considered to be 1$\mu$. This limit of photoengraving accuracy is an obstacle to further miniaturization of semiconductor devices.

SUMMARY OF THE INVENTION

Therefore, it is an essential object of the invention to eliminate the foregoing deficiencies and to obtain positioning accuracy and pattern dimensions which have been unobtainable in the past.

It is another object of the invention to provide a method of manufacturing microstructures in a simplified and easy manner and which have a degree of accuracy nearly equal to that obtained by conventional techniques.

It is further object of the invention to provide a method of manufacturing microstructures having a finer dimension than the limit dimension obtainable by the photoengraving technique.

Characteristic features and functions of the invention will be described in a more understandable manner in connection with the accompanying drawings, in which the same or equivalent members are indicated in the various figures by the same numerals and characters.

DETAILED DESCRIPTION OF THE INVENTION

Generally, a thickness of a surface layer such as an oxide layer, nitride layer and so forth formed on a base material can be obtained with an accuracy up to 100 A. and with high reproducibility by controlling the time, temperature, solution or atmosphere to be utilized in oxidation or nitrogenation and the oxidizing voltage in case of anode oxidation, etc.

Figure 1A:
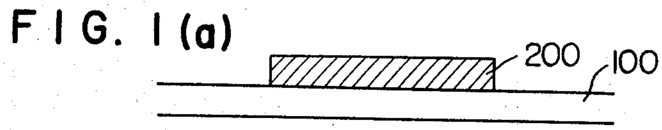
FIGS. 1(*a*), 1(*b*) and 1(*c*) are sectional views showing processing steps according to the invention.
Figure 1B:
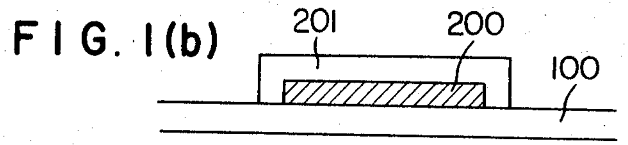
Figure 1C:
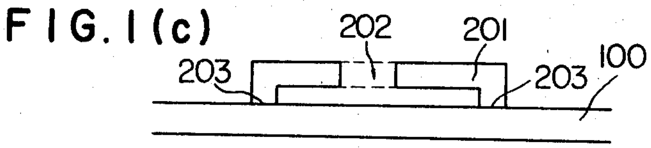

In the present invention, there is obtained smaller dimensions as compared with the dimension limited by the photoengraving technique by using the feature described above. That is, as shown in FIG. 1(*a*), on the surface of a base substance 100 to be worked is formed another substance layer 200 in an arbitrary shape, and after the composition of this surface layer is changed by the application of a layer 201 as shown in FIG. 1(*b*), the base substance layer of unchanged composition is removed through a hole 202 which is bored in the layer 201, as seen in FIG. 1(*c*), and thereafter a portion 203, which is in contact with the substance 100 of the film 201, is utilized as a means (fabricating means) for determining the fabrication dimension and pattern, whereby the object of the present invention can be achieved.

Hereinafter, one example of the invention will be described with reference to the accompanying drawings.

Figure 2A:
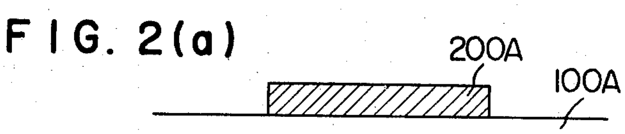
FIGS. 2(*a*) and 2(*b*) are similar sectional views illustrating processing steps of one example according to the invention.
Figure 2B:
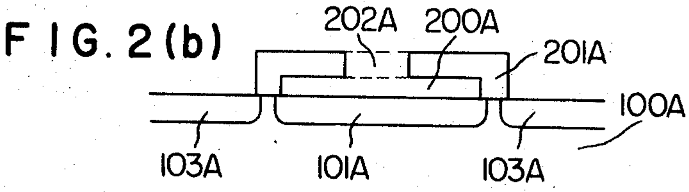

First of all, the description is made for the case where a pattern having a fine dimension is used, that is, a thin aluminum pattern layer 200A is vacuum deposited on the surface of a microstructure or semiconductor substrate 100A as shown in FIG. 2(*a*), and thereafter it is formed into the desired shape by the photoengraving technique. In this case, the dimension of the photoengraved thin aluminum layer may be sufficiently larger than 1$\mu$.

Next, as shown in FIG. 2(*b*), the exposed surface of the thin aluminum layer is chemically changed by anodic oxidation into a layer or portion of changed composition which is in direct contact with the substrate, and a hole 202A is formed by boring in a portion of the oxide layer 201A. Then for example, an aqueous solution of chemicals such as NaOH is used to remove the remaining aluminum 200A of unchanged composition by dissolution whereby remaining oxide layer is used as a diffusion mask to carry out impurity diffusion into the semiconductor substrate in an atmosphere of an impurity gas.

The resulting semiconductor regions 101A and 103A can be formed of a conductivity type which is opposite from that of the substrate 100A, so that if diffused regions 101A and 103A at both sides of the oxide layer 201A are utilized respectively as source and drain regions, it is possible to obtain a MOS type field effect transistor having extremely short channel or alternatively if the region 101A is used as emitter and the region 103A is used as collector, it can be used as a lateral transistor having extremely small base width. For instance, silicon nitride film can be used as the base substance layer 200 or 200A because the oxide, silicon oxide, works as a diffusion mask and an etching mask.

The distance between the regions 101A and 103A is determined only by the thickness of the oxide layer 201A and the distance of the impurity diffusion, and therefore there is no relation to the photoengraving technique. Therefore, according to the present invention, small dimension and high accuracy can be materialized.

In this case, the substance layer to be formed on the semiconductor may consist of not only aluminum but also the arbitrary substance of which compound can be used as the diffusion mask.

Figure 3A:
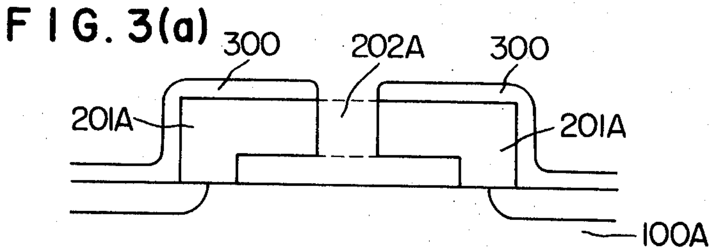
FIGS. 3(*a*) and3(*b*) are similar sectional views showing processing steps of another example according to the invention.
Figure 3B:
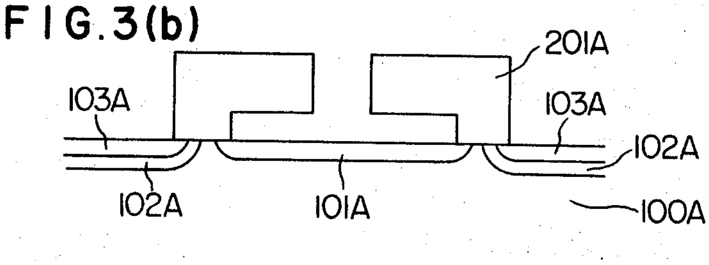

Now, another example of the invention where excellent accuracy can be obtained will be described with reference to FIGS. 3(*a*) and 3(*b*). In this example, the oxide layer 201A of changed composition is formed on the surface of the semiconductor, as shown in FIG. 3(*a*), by the same process as that in the example of FIGS. 2(*a*) and 2(*b*), and furthermore an oxide layer 300 of silicon containing an impurity having opposite conductivity to that of substrate 100A is formed thereon. A hole 202A is bored through the oxide layers 201A and 300, the remaining aluminum of unchanged composition is removed therethrough, and thereafter heat is applied to effect the diffusion.

Subsequently, impurity diffusion of the same conductivity type as that of the substrate is carried out without removing the oxide layer 300 in the case in which it is thin or after removal of it in the case in which it is thick. in an atmosphere of an impurity gas.

In this case, the diffusion length is selected to become less than the initial diffusion distance as shown in FIG. 3(*b*). Let it be assumed that the resulting semiconductor regions 101A, 102A and 103A are respectively utilized as a portion of large impurity concentration of the drain region, a region in the surface of which a channel is formed and a source region, it is possible to obtain an MOS type field effect transistor which has small drain resistance and is suitable for high voltage. In this case, on the surface of the semiconductor the positions of the region 102A in which a channel is formed and of the region 101A of large impurity concentration are automatically determined by the thickness of the oxide layer 201A. Furthermore, the length of the region 102A at the surface between regions 100A and 103A is determined by utilizing the double diffusion process wherein the oxide layer 201A is used as an identical diffusion mask, thereby to obtain a very short channel with an excellent accuracy.

As will be seen from the foregoing examples, according to the invention, the fabrication of a pattern of small dimensions which has been considered impossible heretofore becomes possible and a positioning alignment of high accuracy can be obtained. Even if the edge of the plane pattern 200A which is formed by the photoengraving process is irregular and of low accuracy, the width of the pattern to be obtained by utilizing the oxide layer is constant at any portion, so that there is no chance that the regions 101A and 103A in FIGS. 2(*b*) and 3(*b*) become partially connected. The substances to which the present invention is applicable are not only the semiconductor but also metal, for example, platinum and in the latter case an etching of the miniature pattern of a thin film of platinum can be easily effected by using the oxide layer 201A as the mask. Also the layer to be utilized as the mask may be not only the oxide layer but also various other kinds of layers, such as a nitride layer.

We claim:

1. A method of manufacturing a microstructure mask comprising: forming a substance layer on a surface portion of a workpiece; working said substance layer into a desired configuration having an exposed surface including a side edge portion adjacent the workpiece surface; changing the chemical composition of said substance layer at said exposed surface so as to form in said substance layer a layer of changed composition overlying an unchanged layer and wherein the changed layer contacts and overlies said workpiece surface at said side edge portion; forming a hole through a portion of said changed layer; removing said unchanged layer through said hole; and utilizing that portion of said changed layer which is in contact with the workpiece surface as a mask in a processing operation upon said workpiece.

2. A method of manufacturing a microstructure mask according to claim 1; wherein said workpiece comprises a semiconductor substrate; wherein after changing the chemical composition of said substance layer at said exposed surface, a layer of silicon oxide containing an impurity having opposite conductivity to that of said semiconductor substrate is formed thereon; and wherein said forming step comprises forming a hole through both a portion of said layer of silicon oxide and said changed layer.

3. A method of manufacturing a microstructure mask according to claim 1; wherein said layer of changed composition is an oxide layer.

4. A method of manufacturing a microstructure mask according to claim 1, wherein said layer of changed composition is a nitride layer.

5. A method of manufacturing a microstructure mask comprising: providing a microstructure substrate; forming a pattern layer on said microstructure substrate having an exposed surface including a side edge portion adjacent said microstructure substrate; changing the chemical composition of the exposed surface of said pattern layer to form a surface portion of changed composition in direct contact at its side edge portion with said microstructure substrate and overlying the remaining portion of unchanged composition; forming a hole through said surface portion of changed composition; and removing said remaining portion of unchanged composition through said hole to define a hollow mask on said microstructure substrate.

6. A method according to claim 5; wherein said changing step comprises oxidizing the exposed surface of said pattern layer to form therearound an oxide surface layer comprising said surface portion of changed composition; and wherein said removing step comprises removing the remaining portion of unchanged composition which has not undergone oxidation to define a hollow mask composed of said oxide layer on said microstructure substrate.

7. A method according to claim 5; wherein said changing step comprises nitrogenizing the exposed surface of said pattern layer to form therearound a nitride layer comprising said surface portion of changed composition; and wherein said removing step comprises removing the remaining portion of unchanged composition which has not undergone nitrogenation to define a hollow mask composed of said nitride layer on said microstructure substrate.

8. A method according to claim 5; wherein said microstructure substrate comprises a semiconductor substrate; and including forming a layer of silicon oxide containing an impurity having opposite conductivity to that of said semiconductor substrate on said surface portion of changed composition; and wherein said forming step comprises forming a hole through both said surface portion of changed composition and said layer of silicon oxide.

References Cited

UNITED STATES PATENTS

| | | | |
|---|---|---|---|
| 3,135,638 | 6/1964 | Cheney et al. | 156—11 |
| 3,574,010 | 4/1971 | Brown | 148—187 |
| 3,210,214 | 10/1965 | Smith | 156—13 |

JOHN F. CAMPBELL, Primary Examiner

W. TUPMAN, Assistant Examiner

U.S. Cl. X.R.

156—3, 17; 29—578